Feb. 1, 1966 W. P. HOPPER, JR 3,233,044

FM STEREOPHONIC MULTIPLEX RECEIVER HAVING A SINGLE STAGE FOR FREQUENCY DOUBLING OF THE PILOT SIGNAL AND AMPLIFICATION OF THE SUB-CARRIER AND L-R SIGNALS

Filed Oct. 19, 1964 2 Sheets-Sheet 1

INVENTOR:
William P. Hopper, Jr.
By Smyth, Roston & Pavitt
Attorneys

Feb. 1, 1966 W. P. HOPPER, JR 3,233,044

FM STEREOPHONIC MULTIPLEX RECEIVER HAVING A SINGLE STAGE FOR FREQUENCY DOUBLING OF THE PILOT SIGNAL AND AMPLIFICATION OF THE SUB-CARRIER AND L-R SIGNALS

Filed Oct. 19, 1964 2 Sheets-Sheet 2

INVENTOR:
William P. Hopper, Jr.

By Smyth, Roston & Pavitt
Attorneys

United States Patent Office 3,233,044
Patented Feb. 1, 1966

3,233,044

FM STEREOPHONIC MULTIPLEX RECEIVER HAVING A SINGLE STAGE FOR FREQUENCY DOUBLING OF THE PILOT SIGNAL AND AMPLIFICATION OF THE SUB-CARRIER AND L-R SIGNALS

William P. Hopper, Jr., Venice, Calif., assignor to Packard-Bell Electronics Corporation, Los Angeles, Calif., a corporation of California Filed Oct. 19, 1964, Ser. No. 404,620
19 Claims. (Cl. 179—15)

This is a continuation-in-part of application Serial No. 195,124, filed May 16, 1962 by William P. Hopper, Jr. for System for Transmitting and Receiving Signals, now abandoned.

This application relates to a system for reproducing stereophonic sound. More particularly, the application relates to a system for receiving signals radiated by a transmitter on a multiplexing basis to represent stereophonic sound and for detecting the received signals and for combining the received signals in a particular relationship to obtain the reproduction of the stereophonic sound.

A system has been recently adopted by the administrative agencies of the U.S. Government to obtain the transmission and reception of signals representing stereophonic sound. The system includes a transmitter which combines in particular relationships the signals produced at two displaced microphones. The signals from a first one of the displaced microphones (designated as "L") are added to the signals from the other displaced microphone (designated as "R") in one relationship to obtain signals designated as "L+R." In the other relationship, the signals designated at "R" are subtracted from the signals designated at "L" to obtain signals designated as "L—R." The "L—R" signals are modulated on a sub-carrier at a particular frequency such as 38 kilocycles per second to distinguish these signals from the "L+R" signals, and the sub-carrier of 38 kilocycles per second is then suppressed. The "L+R" signals and the modulated "L—R" signals are then combined and are transmitted simultaneously to a receiver removed from the position of the transmitter.

The multiplexed signals received at the distant position are detected to recover the "L+R" signals and the modulated "L—R" signals. The modulated "L—R" signals are then converted to a form for detection at the receiver by producing signals at the sub-carrier frequency of 38 kilocycles per second and mixing the signals with the received "L—R" signals to reproduce the modulated "L—R" signals. The modulated "L—R" signals are then detected to reproduce the "L—R" signals. The "L—R" signals are combined in an additive relationship with the "L+R" signals to obtain the "L" signals, these signals being introduced through a power amplifier to one of two displaced speakers at the receiver. The "L—R" are also combined in a subtractive relationship with the "L+R" signals to obtain the "R" signals, and the "R" signals are introduced through a power amplifier to the other speaker at the receiver. In this way, the stereophonic sounds at the transmitter are reproduced at the receiver.

In spite of the considerable work which has been performed by various groups during the past several years on the stereophonic system described above and now adopted by the administrative agencies of the U.S. Government, certain difficulties still remain in the construction and operation of the stereophonic system. One difficulty results from the fact that switches have been employed in the system for distinguishing between monophonic transmission and reception involving the use of the "L" and "R" microphones as a single source, and stereophonic transmission and reception involving the use of both the "L" and "R" microphones as separate sound sources. For example, monophonic reception would be obtained in one position of the switch and stereophonic reception would be obtained in the second position of the switch. This requires the listener to operate the switch to the proper position in accordance with the type of reception that he desires.

Another difficulty with the systems now in use results from the complexity in the construction and operation of the system. This is especially true in the stages for demodulating the "L—R" signals received at the removed position to obtain the "L—R" signals. The complexity in construction and operation also occurs in the stages for combining the "L+R" signals and "L—R" signals to separately recover the "L" signals and the "R" signals. Since these stages are complex in construction, a considerable amount of distortion occurs in the recovery of the "L—R" signals and in the subsequent recovery of the "L" signals and the "R" signals.

This invention provides a system for overcoming the above difficulties. For example, the system is able to obtain a reproduction either of monophonic sound or of stereophonic sound without the use of any switches as in the systems now in use. The system also uses a minimum number of stages to recover the "L—R" signals and to combine the "L—R" signals with the "L+R" signals in particular relationships to obtain an independent recovery of the "L" signals and the "R" signals.

The system constituting this invention includes a first stage which operates on the "L—R" signals to introduce a sub-carrier at a particular frequency such as 38 kilocycles. This sub-carrier is introduced to the "L—R" signals because of the suppression of the sub-carrier at the transmitter during the modulation of the "L—R" signals for purposes of transmission. The first stage also operates to amplify both the "L—R" signals and the sub-carrier at the same time that the sub-carrier is being produced. The signals from the first stage are then introduced to a second stage which performs a number of different functions. The second stage provides a by-pass for the signals at the sub-carrier frequency so that only the audio envelope represented by the "L—R" signals is retained. The second stage also operates to produce "L—R" signals with first and second opposite polarities. The second stage is biased to produce signals only during the time that stereophonic signals are being transmitted on a multiplexed basis to the receiver.

The "L—R" signals of one polarity are combined with the "L+R" signals in an additive relationship to obtain the "L" signals. The "L—R" signals of opposite polarity are combined with the "L+R" signals to obtain the "R" signals. In this way, the "L" signals and the "R" signals are independently reproduced and are introduced after amplification to separate speakers to obtain the reproduction of the stereophonic sounds at the receiver.

When only monophonic signals are transmitted to the receiver, the receiver operates automatically to pass only the "L+R" signals representing the monophonic sounds. This results from the fact that the second stage described above for passing the envelope of the "L—R" signals is biased to cut-off so as to pass signals only when "L—R" signals are being produced during stereophonic transmission and reception.

Figure 1:
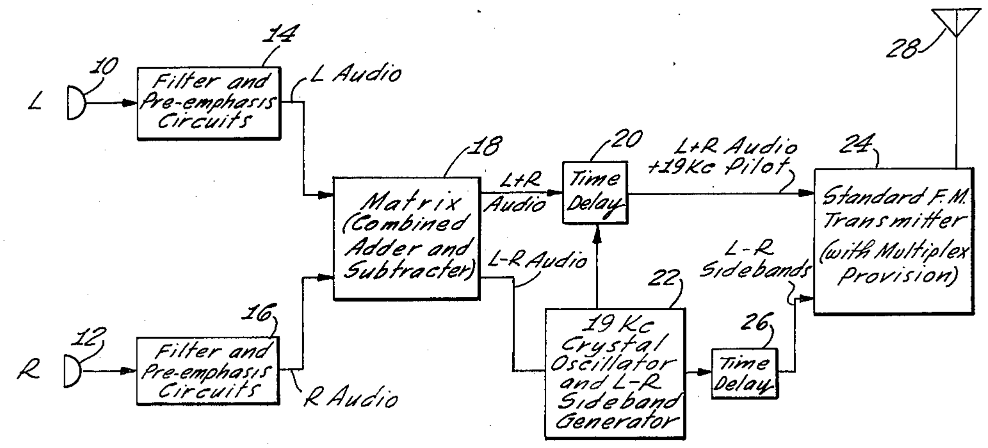
FIGURE 1 is a somewhat schematic view in block form of a system for producing signals representing the sounds at two displaced positions, modulating the signals and transmitting the modulated signals.

The transmitter shown in FIGURE 1 includes a pair of displaced microphones 10 and 12. For example, the microphones may be disposed at opposite sides of a concert hall to receive the musical sounds radiated to the microphones. The composite sounds produced at the microphones 10 and 12 provide a stereophonic representation of the music produced in the concert hall. Each of the microphones 10 and 12 is constructed in a conventional manner to produce electrical signals having characteristics corresponding at each instant to the characteristics of the sounds radiated to the microphones. The signals produced by the microphones 10 and 12 may be respectively considered as "L" and "R" signals corresponding to the disposition of the microphones 10 and 12 at the left and right sides of the concert hall.

The signals from the microphones 10 and 12 may be respectively introduced to circuits 14 and 16 which are constructed to pass the signals only in a particular band of frequencies and to pre-emphasize particular frequencies in the bands relative to other frequencies in the bands. The signals from the circuits 14 and 16 are introduced to a matrix network 18 to obtain the combination of the signals in a particular relationship. The matrix relationship 18 may be constructed in a conventional manner to combine the signals on an additive basis and also to combine the signals on a subtractive basis. When the "L" and "R" signals from the circuits 14 and 16 are added in amplitude at each instant by the matrix network 18, the resultant signals produced by the network have an amplitude at each instant corresponding to the combined amplitudes of the signals from the circuits 14 and 16. These signals may be designated as "L+R" signals. Similarly, the subtractive signals produced by the matrix network 18 have an amplitude corresponding at each instant to the difference in the amplitudes of the signals from the circuits 14 and 16 at that instant. The subtractive signals may be designated as "L—R" signals.

The "L+R" signals and the "L—R" signals produced by the matrix network 18 both occur in an audio range of frequencies. The "L+R" signals are passed through a time delay stage 20 and are mixed with a pilot signal from an oscillator 22. This pilot signal may be provided with a suitable frequency such as 19 kilocycles. A frequency of 19 kilocycles per second is desirable since it occurs just above the audio range of frequencies and cannot interfere with the signals in the audio range. The "L+R" signals and the pilot signals at 19 kilocycles per second are then introduced to a transmitter 24.

The pilot signals at 19 kilocycles from the generator 22 are also doubled in frequency to produce sub-carrier signals at a frequency of 38 kilocycles per second. The "L—R" signals are mixed in the generator 22 with the sub-carrier signals at 38 kilocycles per second, and the sub-carrier signals at 38 kilocycles per second are then suppressed in the generator so that only the upper and lower sidebands are introduced at the transmitter 24. The lower sideband of the modulated "L—R" signals may have frequencies in the range of 23 to 38 kilocycles per second and the upper sideband of the modulated "L—R" signals may have frequencies in the range of 38 to 53 kilocycles per second. The modulated "L—R" signals with the suppressed sub-carrier are introduced to the transmitter 24 through a time delay stage 26.

The delays provided by the stages 20 and 26 are related so that the transmitter 24 can simultaneously transmit the "L+R" signals and the modulated "L—R" signals. This type of transmission is obtained by providing a conventional frequency modulation transmitter with multiplexing provisions. The frequency modulated signals produced on a multiplexing basis by the transmitter 24 are introduced to an antenna 28 for transmission to the receiver indicated in FIGURE 2.

Figure 2:
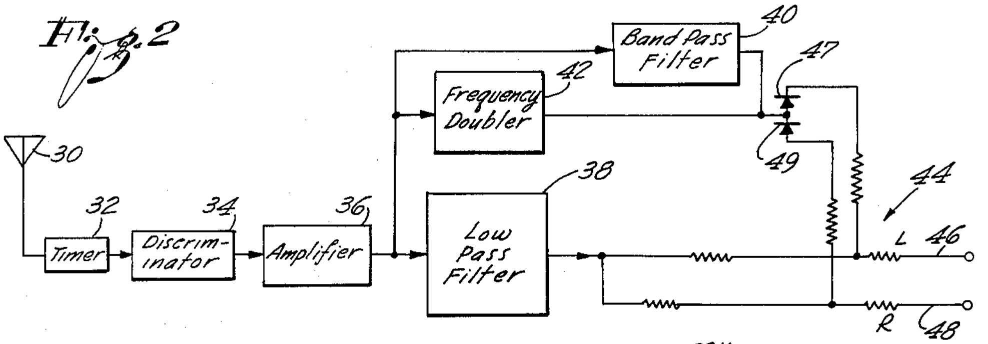
FIGURE 2 is a somewhat schematic view in block form of a system for receiving the modulated signals from the transmitter, demodulating the signals and combining the demodulated signals to obtain signals representing the sounds at the displaced positions.

The system shown in FIGURE 2 includes an antenna 30 for receiving the signals radiated from the transmitter shown in FIGURE 1 and described above. The signals from the antenna 30 are introduced to a tuner 32 which is tuned to the frequency of the signals representing the station to be heard at each instant. The output from the tuner 32 is detected by a stage 34 such that the frequency modulations of the received signals are converted to corresponding amplitude modulations representing the combined output of the time delay stages 20 and 26 in FIGURE 1. The output signals from the detector 34 are amplified as at 36 and are then introduced to a pair of filters 38 and 40.

The filter 38 is provided with characteristics to pass signals in a range of frequencies extending from approximately fifty cycles per second to approximately 15 kilocycles per second. This corresponds to the range of frequencies represented by the "L+R" signals. The filter 40 is constructed with band pass characteristics to pass signals having a range of frequencies above and below 38 kilocycles per second. For example the band pass filter 40 may be constructed to pass signals in a range of frequencies extending from approximately 23 kilocycles per second to 53 kilocycles per second. This corresponds to the range of frequencies in the modulated "L—R" signals which are produced in the stage 22 of FIGURE 1.

The signals passing through the amplifier 36 also include the pilot signal of 19 kilocycles per second. These signals are doubled in frequency by a stage 42 and are combined with the modulated "L—R" signals passing through the band pass filter 40. The envelope of the resultant "L—R" signals is detected to obtain the "L—R" signals. These signals are combined with "L+R" signals in a matrix network indicated generally at 44 to separately obtain the "L" signals on a line 46 and the "R" signals on a line 48. The "L" signals on the line 46 are obtained by combining the "L+R" signals and the "L—R" signals in an additive relationship, this additive relationship being obtained because of the passage of the "L—R" signals through a diode 47. The "R" signals on the line 48 are obtained by combining the "L—R" signals and the "L+R" signals in a subtractive relationship, this subtractive relationship resulting from the passage of the "L—R" signals through a diode 49. The "L" signals on the line 46 are introduced through a power amplifier (not shown) to one of a pair of displaced speakers and the "R" signals are introduced through a power amplifier (not shown) to the other displaced speaker to obtain the reproduction of the stereophonic sound.

Figure 3:
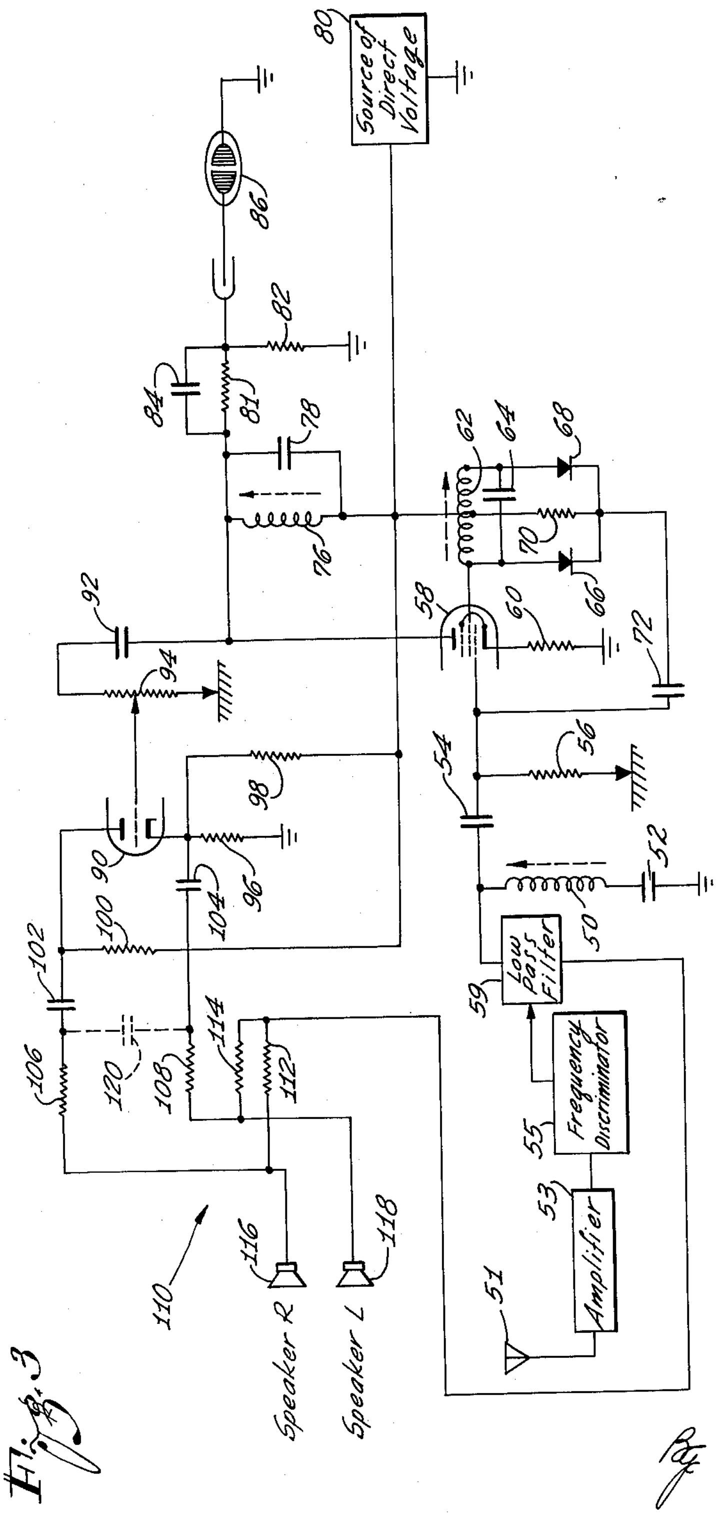
FIGURE 3 is a detailed circuit diagram of the stages included in this invention for demodulating the received signals and for combining the demodulated signals in a particular relationship to obtain the reproduction of the signals representing the sounds at the displaced positions.

This invention relates to improvements in the construction and interrelationship of the stages 40, 42 and 44 shown in FIGURE 2. As illustrated in FIGURE 3, the transmitted signals are received by an antenna 51 and are amplified as at 53. The frequency modulations are removed by a discriminator 55 so that "L+R" signals and the modulated "L—R" signals are obtained. These signals are then introduced to a low-pass filter 59. The low-pass filter 59 operates to de-emphasis the relatively high frequencies represented by the modulated "L—R" signals so that substantially only the "L+R" signals are obtained at the output terminal of the filter.

Figure 4:
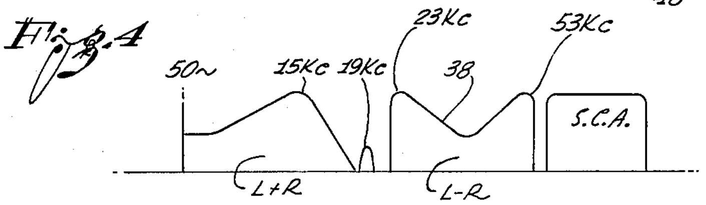
FIGURE 4 is a curve illustrating the wave band characteristics of the modulated signals radiated from the transmitter and received at the receiver.

The signals from the low-pass filter 59 are introduced to a coil 50 and a capacitor 52 which are connected in series between the discriminator and a suitable reference potential such as chassis ground. The capacitor 52 may be provided with a suitable value in the order of 220 micro-microfarads and the coil 50 may be provided with an inductance to form a series resonant circuit at a suitable frequency such as 67 kilocycles per second. As will be noted, this frequency is somewhat above the frequency of 53 kilocycles per second corresponding to the upper limit of the modulated "L—R" signals produced by the stage 22 in FIGURE 1. As illustrated in FIGURE 4, the frequency of 67 kilocycles per second has an intermediate value in the band of frequencies in which background music for restaurants and other similar establishments is transmitted.

It will be seen that the trapping of signals in the range of frequencies corresponding to background music for restaurants occurs before the modulated "L—R" signals are detected. This prevents the signals representing background music for restaurants from distorting the "L—R" signals during the detection of the modulated "L—R" signals.

The signals appearing across the coil 50 and the capacitor 52 pass through a coupling capacitor 54 to the control grid of a current control member 58 such as a vacuum tube. The capacitor 54 operates in conjunction with a resistor 56 to pass the signals only above a particular frequency such as 15 kilocycles per second. In this way the capacitor 54 and the resistor 56 act in conjunction with the coil 50 and the capacitor 52 to remove the "L+R" signals and to pass signals only in the band between approximately 23 kilocycles per second and 53 kilocycles per second. The resistor 56 is connected between the control grid of the control member 58 and a floating ground. The capacitor 54 and the resistor 56 may respectively have values in the order of 2000 micro-microfarads and 8.2 kilohms.

The control member 58 may be a pentode included in an envelope which is commercially designated as a "6EA8." The cathode of the control member 58 is connected to one terminal of a resistor 60 having its second terminal connected to the reference potential such as chassis ground. The resistor 60 may be provided with a suitable value in the order of 100 ohms. The suppressor grid of the control member 58 is common with the cathode of the member. The screen grid of the member 58 is connected to first terminals of a coil 62 and a capacitor 64. The capacitor 64 is provided with a suitable value such as in the order of 1600 micro-microfarads, and the coil 62 is provided with a value to form a parallel resonant circuit with the capacitor 64 at the pilot frequency of 19 kilocycles per second.

The first terminals of the capacitor 64 and the coil 62 are connected to the plate of a diode 66, and the second terminals of the capacitor 64 and the coil 62 are provided with a common connection with the plate of a diode 68. The cathodes of the diodes 66 and 68 have a common connection with one terminal of a resistor 70, the second terminal of which is connected to a center tap on the coil 62. A particular direct voltage such as in the order of +100 volts is also introduced to the center tap of the coil 62 from a source 80 of direct voltages. A capacitor 72 is disposed electrically between the control grid of the control member 58 and the cathodes of the diodes 66 and 68. The resistor 70 may be provided with a suitable value in the order of 82 kilohms, and the capacitor 72 may be provided with a suitable value in the order of 68 micro-microfarads.

The signals introduced to the control grid of the current control member 58 include the modulated "L—R" signals and also include the pilot signals at 19 kilocycles per second. The pilot signals at 19 kilocycles per second are amplified in the control member 58 and are introduced in amplified form to the parallel resonant circuit formed by the coil 62 and the capacitor 64.

In one-half cycle, the pilot signals are passed by the diode 66 and in the other one-half cycle the pilot signals are passed by the diode 68. The diodes 66 and 68 accordingly cooperate with the parallel resonant circuit formed by the coil 62 and the capacitor 64 to form a full wave rectifier. By rectifying the pilot signals at 19 kilocycles per second, signals at a frequency of 38 kilocycles per second are produced. These signals have a frequency corresponding to the sub-carrier frequency on which the "L—R" signals are modulated.

The sub-carrier signals at 38 kilocycles per second are coupled through the capacitor 72 to the control grid of the control member 58 and are amplified by the control member. Because of this, amplified signals at the sub-carrier frequency of 38 kilocycles per second appear on the plate of the current control member. The modulated "L—R" signals are also amplified by the control member 58 and are produced in amplified form at the plate of the control member. In this way, the modulated "L—R" signals and the sub-carrier signals at 38 kilocycles per second are mixed as a first step in reproducing the "L—R" signals.

The signals appearing on the plate of the control member 58 are introduced to first terminals of a coil 76 and a capacitor 78 which are connected in parallel. The capacitor 78 may be provided with a suitable value in the order of 680 micro-microfarads, and the coil 76 may be provided with a suitable value to resonate with the capacitor 78 at the sub-carrier frequency of 38 kilocycles per second. The second terminals of the coil 76 and the capacitor 78 are connected to the source 80 of direct voltage to receive a suitable positive potential such as approximately +100 volts.

The signals on the first terminals of the coil 76 and the capacitor 78 are introduced to a voltage divider network formed by a pair of resistors 81 and 82. The resistors 81 and 82 extend electrically in series from the first terminals of the coil 76 and the capacitor 78 to the suitable reference potential such as chassis ground. The resistor 81 and the capacitor 82 are respectively provided with suitable values such as in the order of 1.5 megohms and 1.8 megohms. A capacitor 84 having a suitable value such as in the order of 22 micro-microfarads is in parallel with the resistor 81. A neon bulb 86 is disposed electrically between the suitable reference potential such as chassis ground and the terminal common to the resistor 81 and 82 and the capacitor 84.

Figure 5:
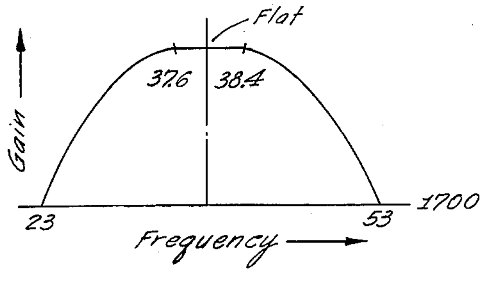
FIGURE 5 is a curve illustrating the operational characteristics of one of the stages shown in FIGURE 3 to obtain a compensation for the pre-emphasis of particular signals at the transmitter shown in FIGURE 1.

Since the coil 76 and the capacitor 78 are tuned to the sub-carrier frequency of 38 kilocycles per second, they operate to pass the modulated "L—R" signals and to inhibit the passage of the pilot signals at 19 kilocycles per second. The coil 76 and the capacitor 78 cooperate with the control member 58 to provide frequency response characteristics similar to those illustrated in FIGURE 5. As will be seen, an optimum response is provided at a center frequency of 38 kilocycles per second and progressively decreasing responses are provided above and below 38 kilocycles per second with progressive changes from 30 kilocycles per second. This response characteristic is provided primarily through the selection of the control member 58 and the selection of a value for Q in the parallel resonant circuit formed by the coil 76 and the capacitor 78. The response characteristics illustrated in FIGURE 5 are chosen to compensate for the pre-emphasis provided on the "L—R" signals by the stages 14 and 16 in FIGURE 1.

The neon bulb receives a portion of the direct voltage from the source 80 because of the voltage dividing action provided by the resistors 81 and 82. The direct voltage received by the neon bulb 86 is insufficient to illuminate the bulb. The neon bulb 86 also receives an additional voltage with the pilot signal at 19 kilocycles per second when the "L—R" signals are received. This results from the introduction of the signals at the sub-carrier frequency of 38 kilocycles per second through the capacitor 84 to the neon bulb 86. Substantially all of the voltage at 38 kilocycles per second is introduced to the neon bulb because of the by-pass provided by the capacitor 84. The combination of the direct voltage from the source 80 and the signals at the sub-carrier frequency of 38 kilocycles per second cause the neon bulb 86 to become illuminated so as to provide an indication that a stereophonic reproduction of sound is being provided at the receiver.

The signals from the parallel resonant sub-circuit formed by the coil 76 and the capacitor 78 are introduced through the capacitor 92 and the potentiometer 94 to the grid of a control member 90 such as a vacuum tube. These signals are introduced to the grid of the control member 90 through a coupling capacitor 92 and a potentiometer 94, which extend electrically in series to the floating ground from the parallel combination of the coil 76 and the capacitor 78. The movable arm of the potentiometer 94 is connected to the control grid of the control member 90. The capacitor 92 and the potentiometer 94 may be respectively provided with values in the order of 470 micro-microfarads and 500 kilohms.

The control member 90 may be include in the same envelope such as a "6EA8" with the control member 58. The cathode of the control member 90 is connected to first terminals of a pair of resistors 96 and 98. The second terminal of the resistor 96 is connected to the reference potential such as chassis ground, and the second terminal of the resistor 98 is connected to receive a suitable potential such as +100 volts from the source 80 of direct voltage. The resistors 96 and 98 may be respectively provided with values in the order of 3.3 kilohms and 100 kilohms.

A resistor 100 having a suitable value in the order of 3.3 kilohms is disposed electrically between the plate of the control member 90 and the source 80 of direct voltage. As will be seen, the resistor 100 has the same value as the resistor 96. This causes the signals introduced to the control grid of the control member 90 to be produced with opposite polarities and with equal amplitudes on the cathode and plate of the control member 90. Since the control member 90 is biased so that only positive peaks of the "L—R" signals will cause it to conduct, signals of one polarity are produced on the plate of the tube 90 in the range of frequencies between 23 and 53 kilocycles per second and in the range of frequencies between 50 cycles per second and 15 kilocycles per second. Signals of an opposite polarity and of equal amplitude are produced on the cathode of the control member 90 in the range of frequencies between 23 and 53 kilocycles per second, and in the range of frequencies between 50 cycles per second and 15 kilocycles per second.

The signals on the cathode and plate of the control member 90 are respectively introduced through coupling capacitors 102 and 104 to resistors 106 and 108 in a matrix network generally indicated at 110. The capacitors 102 and 104 may be provided with suitable values such as in the order of .047 micro-microfarad. A distributed capacitance indicated in broken lines at 120 in FIGURE 3 may be considered as connected between the resistors 106 and 108. This distributed capacitance is provided with a value to provide a by-pass for signals of relatively high frequency such as 23 kilocycles per second to 53 kilocycles per second such that signals at these frequencies are not introduced to the resistors 106 and 108. In this way, only signals in the audio range of 50 cycles per second to 15 kilocycles per second are introduced to the resistors 106 and 108. These signals correspond to the envelope of the modulated "L—R" signals introduced to the control grid of the control member 90.

The resistors 106 and 108 are respectively connected to first terminals of a pair of resistors 112 and 114, each having a suitable value in the order of 47 kilohms. The first terminals of the resistors 112 and 114 are also respectively connected through power amplifiers (not shown) to speakers 116 and 118 which are disposed at displaced positions within a room to provide a stereophonic reproduction of the sounds represented by the received signals. The second terminals of the resistors 112 and 114 have a common connection with the output terminals of the low-pass filter 59 so as to receive the "L+R" signals passed by the resistor and the capacitor.

The matrix arrangement formed by the resistors 108 and 114 operate to combine in an additive relationship the "L+R" signals from the low-pass filter 59 and the "L—R" signals at the cathode of the control member 90. This results from the fact that the signals at the cathode of the control member 90 have the same phase as the signals introduced to the grid of the control member. By combining the "L+R" signals and the "L—R" signals on an additive basis, signals corresponding to "2L" are produced in the matrix arrangement formed by the resistors 108 and 114 and are introduced through a power amplifier (not shown) to the speaker 118 at one side of the room.

Since the control member 90 operates to invert the signals introduced to its control grid, signals representing —(L—R) are produced on the plate of the control member. These signals are combined on an additive basis with the "L+R" signals so as to obtain an effective subtraction of (L—R) from (L+R). In this way, signals representing "2R" are introduced through a power amplifier (not shown) to the speaker 116 at the opposite side of the room. The respective broadcast of the "L" and "R" signals by the speakers 116 and 118 provides a faithful reproduction of the stereophonic sound.

The system illustrated in FIGURE 3 and described above has certain important advantages in comparison to the prior art. It removes signals outside the band between 23 and 53 kilocycles per second before the modulated "L—R" signals in the frequency range of 23 to 53 kilocycles per second are amplified and detected. The system also includes a single stage for producing the signals at the sub-carrier frequency of 38 kilocycles per second and for amplifying the signals at this frequency and the modulated "L—R" signals in the frequency range of 23 to 53 kilocycles per second.

The system is further advantageous in the inclusion of a single stage for removing the signals at the sub-carrier frequency of 38 kilocycles per second, detecting the modulated "L—R" signals to obtain the "L—R" signals in the frequency range of 50 to 15,000 signals per second, and producing first and second "L—R" signals of opposite phase. By providing the first and second stages as discussed above, the system is compatible to the reception of both monophonic and stereophonic sounds at different times without any need to switch manually between the reception of monophonic sound and the reception of stereophonic sound. In this way, an output indication is automatically provided by the system constituting this invention as to whether monophonic transmission and reception are occurring or as to whether stereophonic transmission and reception are occurring. This is indicated by the absence or presence of illumination in the neon bulb 86.

As previously described, the transmitter shown in FIGURE 1 pre-emphasizes signals at substantially 15, 23 and 53 kilocycles per second, as illustrated schematically in FIGURE 4. The receiving system constituting this invention is advantageous in that it de-emphasizes such signals before the "L—R" signals are detected in the single stage including the control member 90 in FIGURE 4. This is desirable since the single stage including the member 90 has non-linear characteristics because of its bias to a state of non-conductivity and because of its conductance only at the positive peaks of the modulated "L—R" signals. De-emphasizing the pre-emphasized signals before the stage including the control member 90 prevents any distortions from occurring in the "L—R" signals because of the non-linear characteristics of this stage.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for use in a system wherein first and second stereo signals representing stereo sound are added to obtain a first resultant signal and wherein the first and second stereo signals are subtracted to obtain a second resultant signal and wherein the second resultant signals are modulated on a suppressed sub-carrier and wherein the first resultant signals and the modulated second resultant signals and a pilot signal having a harmonic relationship to the sub-carrier are transmitted in modulated form to a receiver removed from the transmitter and wherein stages are included at the receiver for demodulating the received signals to recover the first resultant signals and the modulated second resultant signals and the pilot signal, first means responsive to the pilot signals and the modulated second resultant signals and having a passband for passing signals only at the pilot frequency and in the range of frequencies corresponding to the modulated second resultant signals, a first single stage interconnected with the first means and responsive to the signals passed by the first means for changing the frequency of the pilot signal to produce signals at the sub-carrier frequency and for amplifying the signals at the sub-carrier frequency and the modulated second resultant signals passed by the first means to remodulate the sub-carrier with the modulated second resultant signals, a second single stage interconnected with the first single stage and responsive to the signals from the first single stage for detecting the remodulated signals from the first single stage to produce first and second control signals representing the envelope of the remodulated signals from the first single stage and having opposite phases and individually representing the second resultant signals, and second means interconnected with the second single stage and responsive to the first and second control signals and to the first resultant signals for individually combining the first resultant signals with the first control signals and combining the first resultant signals with the second control signals respectively to obtain the first and second stereo signals.

2. In combination for use in a system wherein first and second stereo signals representing stereo sound are added to obtain a first resultant signal and wherein the first and second stereo signals are subtracted to obtain a second resultant signal and wherein the second resultant signals are modulated on a suppressed sub-carrier and wherein the first resultant signals and the modulated second resultant signals and a pilot signal having a harmonic relationship to the sub-carrier are transmitted in modulated form to a receiver removed from the transmitter and wherein stages are included at the receiver for demodulating the received signals to recover the first resultant signals and to recover the modulated second resultant signals and the pilot signal, a first single stage responsive to the modulated second resultant signals and to the pilot signals for producing the sub-carrier signals and for remodulating the modulated second resultant signals relative to the sub-carrier signals, a second single stage interconnected with the first single stage and responsive to the remodulated signals from the first single stage for recovering the second resultant signals in a first phase relationship and for recovering the second resultant signals in a second phase relationship opposite to the first phase relationship, and means interconnected with the second single stage and responsive to the first resultant signals in the absence of the second resultant signals for converting the first resultant signals into monophonic sound and responsive to the first resultant signals and the second resultant signals in the first and second phase relationships for reproducing the stereo sound.

3. The combination set forth in claim 2 wherein means are included for biasing the second single stage to a state of non-conductivity in the absence of the remodulated signals from the first single stage.

4. In combination for use in a system wherein first and second stereo signals representing stereo sound are added to obtain a first resultant signal and wherein the first and second stereo signals are subtracted to obtain a second resultant signal and wherein the second resultant signals are modulated on a suppressed sub-carrier and wherein the first resultant signals and the modulated second resultant signals and a pilot signal having a harmonic relationship to the sub-carrier are transmitted in modulated form to a receiver removed from the transmitter and wherein stages are included at the receiver for demodulating the received signals to recover the first resultant signals and to recover the modulated second resultant signals and the pilot signal, a first single stage responsive to the pilot signals and the modulated second resultant signals for producing signals at the sub-carrier frequency and for remodulating and amplifying the modulated second resultant signals and the signals at the sub-carrier frequency, a second single stage operatively coupled to the first single stage and responsive to the remodulated signals from the first single stage for recovering the second resultant signals in first and second opposite phase relationships and for passing only the second resultant signals in the first and second opposite phase relationships, and a matrix arrangement operatively coupled to the first and second single stages and responsive to the first resultant signals and to the second resultant signals of first and second opposite phase for combining the first resultant signals and the second resultant signals of the first phase and for combining the first resultant signals and the second resultant signals of the second phase respectively to obtain a reproduction of the first and second stereo signals.

5. The combination set forth in claim 4 wherein the second single stage is biased to a state of non-conductivity in the absence of the remodulated signals from the first single stage.

6. In combination for use in a system wherein first and second stereo signals representing stereo sound are added to obtain first resultant signals and wherein the first and second stereo signals are subtracted to obtain second resultant signals and wherein the second resultant signals are modulated on a suppressed sub-carrier and wherein the first resultant signals and the modulated second resultant signals and a pilot signal having a harmonic relationship to the sub-carrier are transmitted in modulated form to a receiver removed from the transmitter and wherein stages are included at the receiver for demodulating the received signals to recover the first resultant signals and to recover the modulated second resultant signals and the pilot signal, a first single stage responsive to the pilot signal and including a tuned circuit for producing signals at the sub-carrier frequency and including a control member for mixing the signals at the sub-carrier frequency with the modulated second resultant signals to produce remodulated signals having upper and lower sidebands with the sub-carrier frequency signals providing the center frequency, a second single stage operatively coupled to the first single stage and responsive to the sub-carrier frequency signals from the first single stage for passing only the lower sideband of the remodulated signals in first and second opposite phases in representation of the second resultant signals and for preventing the passage of the signals at the sub-carrier frequency and the remodulated signals in the upper sideband, and matrix means operatively coupled to the second single stage and responsive to the first resultant signals and the signals passing from the second single stage for combining these signals in particular relationships to obtain the reproduction of the stereo sound.

7. The combination set forth in claim 6 wherein the second single stage is biased to prevent the passage of signals through the second single stage during a lack of occurrence of stereo sound and wherein the matrix means are constructed to reproduce the sound represented by the first resultant signals in the absence of stereo sound.

8. In combination for use in a system wherein first and second stereo signals representing stereophonic sound are added to obtain first resultant signals and wherein the first and second stereo signals are substrated to obtain second resultant signals and wherein the second resultant signals are modulated on a suppressed sub-carrier and wherein the first resultant signals and the modulated second resultant signals and a pilot signal having a harmonic relationship to the sub-carrier are transmitted in modulated form to a receiver removed from the transmitter and wherein stages are included at the receiver for demodulating the received signals to recover the first resultant signals and to recover the modulated second resultant signals and the pilot signals, filter means for receiving the first and second resultant signals and the pilot signals, said filter means being effective to separate the first resultant signals from the modulated second resultant signals and the pilot signals, a first single stage interconnected with the filter means and responsive to the pilot signals for producing signals at the sub-carrier frequency and responsive to the modulated second resultant signals and the signals at the sub-carrier frequency for remodulating these signals to produce the second resultant signals with upper and lower sidebands and with the sub-carrier frequency as the center frequency, a second single stage interconnected with the first single stage and responsive to the remodulated signals from the first single stage for producing the second resultant signals in first and second opposite phases and for passing only the lower sidebands of the second resultant signals in the first and second opposite phases, and matrix means interconnected with the filter means and the second single stage and responsive to the first resultant signals in the absence of signals from the second single stage for reproducing monophonic sound and responsive to the first resultant signals and to the lower sidebands of the second resultant signals in the first and second opposite phases for reproducing the stereophonic sound.

9. In combination in a system wherein first and second stereo signals representing stereophonic sound are added to obtain first resultant signals and wherein the first and second stereo signals are subtracted to obtain second resultant signals and wherein the second resultant signals are modulated on a suppressed sub-carrier and wherein the first resultant signals and the modulated second resultant signals and a pilot signal having a harmonic relationship in the sub-carrier are transmitted in modulated form to a receiver removed from the transmitter and wherein stages are included at the receiver for demodulating the received signals to recover the first resultant signals and to recover the modulated second resultant signals and the pilot signal, filter means responsive to the modulated second resultant signals and having a first portion for passing only signals having frequencies equal to or less than the range of frequencies represented by the modulated second resultant signals and the pilot frequency and a second portion for passing the pilot signals and the signals in the frequency range of the modulated second resultant signals, a first single stage operatively coupled to the filter means and responsive to the pilot signals passed by the second portion of the filter means for producing signals at the sub-carrier frequency, said first single stage being operative to mix the signals at the sub-carrier frequency and the modulated second resultant signals passed by the first means to produce remodulated signals having upper and lower sidebands and a center frequency corresponding to the sub-carrier frequency, a second single stage operatively coupled to the first single stage and normally biased against the passage of any signals, said second single stage being responsive to the remodulated signals from the first single stage for responding only to the lower sidebands of the remodulated signals to produce the second resultant signals in first and second opposite phases only upon the occurrence of the stereophonic sound, and matrix means interconnected with the first portion of the filter and responsive to the first resultant signals and interconnected with the second single stage and responsive to the second resultant signals of first and second opposite phase upon the occurrence of the stereophonic sound for reproducing the stereophonic sound and responsive to the first resultant signals in the absence of stereophonic sound for reproducing monophonic sound.

10. In combination in a system wherein first and second stereo signals representing stereophonic sound are added to obtain first resultant signals and wherein the first and second stereo signals are subtracted to obtain second resultant signals and wherein the second resultant signals are modulated on a suppressed sub-carrier and wherein the first resultant signals and the modulated second resultant signals and a pilot signal having a harmonic relationship to the sub-carrier are transmitted in modulated form to a receiver removed from the transmitter and wherein stages are included at the receiver for demodulating the received signals to recover the first resultant signals and to recover the modulated second resultant signals and the pilot signal, first means responsive to the first resultant signals and the pilot signals and the modulated second resultant signals and having a first portion for passing only the first resultant signals and a second portion for passing signals substantially only in the range of frequencies represented by the pilot signals and the modulated second resultant signals, a first current control member constructed to provide an amplification of signals introduced to the member, a first single stage including the first current control member and including means operatively coupled to the second portion of the first means for introducing the modulated second resultant signals to the first current control member to obtain an amplification of such signals by the first current control member, the first single stage also including means operatively coupled to the first current control member and responsive to the pilot signals for producing signals at the sub-carrier frequency and for introducing the signals at the sub-carrier frequency to the first current control member to obtain a mixing of the modulated second resultant signals and the signals at the sub-carrier frequency for the production of remodulated signals having upper and lower sidebands with a center frequency corresponding to the sub-carrier frequency, a second single stage including a second current control member operatively coupled to the first control member and responsive to the remodulated signals having the upper and lower sidebands for responding only to the lower sidebands to produce the second resultant signals in first and second opposite phases, and matrix means operatively coupled to the first portion of the first means and to the second single stage and responsive to the first resultant signals and the second resultant signals having the first and second opposite phases for mixing the first resultant signals and the second resultant signals of first phase in a particular relation and for mixing the first resultant signals and the second resultant signals of the opposite phase in the particular relationship respectively to obtain the first and second stereo signals.

11. The combination set forth in claim 10 wherein first and second impedances are included in the second single stage and are connected to the second current control member to produce the second resultant signals of first and second opposite phases and wherein means are included in the second single stage and are connected to the second current control member to pass only the second resultant signals of the first and second opposite phases.

12. In combination in a system wherein first and second stereo signals representing stereophonic sound are added to obtain first resultant signals and wherein the first and second stereo signals are substracted to obtain second resultant signals and wherein the second resultant signals are modulated on a suppressed sub-carrier and wherein the first resultant signals and the modulated second resultant signals and a pilot signal having a harmonic relationship to the sub-carrier are transmitted in modulated form to a receiver removed from the transmitter and wherein stages are included at the receiver for demodulating the received signals to recover the first resultant signals and the modulated second resultant signals and the pilot signal, a first single stage including a tuned portion responsive to the pilot signals for producing signals at the sub-carrier frequency and including a first current control member responsive to the modulated second resultant signals and to the signals at the sub-carrier frequency for mixing and amplifying the modulated second resultant signals and the signals at the sub-carrier frequency to produce remodulated signals having upper and lower sidebands with a center frequency corresponding to the sub-carrier frequency, a second current control member constructed to provide an amplification of signals introduced to the second current control member, a second single stage operatively coupled to the first single stage and including the second current control member for introducing the remodulated signals from the first single stage to the second current control member for amplification by the second current control member.

the second single stage including first and second impedances operatively coupled to the second current control member to respectively produce signals having an in-phase and out-of-phase relationship to the remodulated signals, the second single stage including members operatively connected to the second current control member for passing only the lower sidebands with the in-phase and out-of-phase relationships to define second resultant signals with the first and second opposite phases, and matrix means operatively coupled to the second single stage and including two separate channels, said matrix means being responsive to the first resultant signals and the second resultant signals to combine in one channel the first resultant signals and the second resultant signals having the in-phase relationship and to combine in the second channel the first resultant channels and the second resultant signals having the out-of-phase relationship to produce the first and second stereo signals in the two channels.

13. The combination set forth in claim 12, including, means operatively coupled to the first single stage and responsive to the sub-carrier signals from the first single stage for providing an indication as to the reception of stereophonic sound represented by the first and second stereophonic signals.

14. The combination set forth in claim 12 wherein the second current control member is biased against conduction in the absence of the sub-carrier signals from the first stage and is responsive to the sub-carrier signals from the first stage to become conductive for the production of the second resultant signals of the first and second opposite phases.

15. In combination for use in a system wherein first and second stereo signals representing stereo sound are added to obtain first resultant signals and wherein the first and second stereo signals are subtracted to obtain second resultant signals and wherein the second resultant signals are modulated on a suppressed sub-carrier and wherein the first resultant signals and the modulated second resultant signals and pilot signals having a harmonic relationship to the sub-carrier are transmitted in modulated form to a receiver removed from the transmitter and wherein stages are included at the receiver for demodulating the received signals to recover the first resultant signals and the modulated second resultant signals and the pilot signals, a single stage responsive to the pilot signals for converting the pilot signals to signals at the sub-carrier frequency and responsive to the signals at the sub-carrier frequency and the modulated second resultant signals for mixing these signals to produce demodulated signals having upper and lower sidebands with a center frequency corresponding to the sub-carrier frequency, the single stage including:

a current control member having a first control element and first and second output elements, the first control element being connected to receive the pilot signals and the modulated second resultant signals, a full wave rectifier tuned to the sub-carrier frequency and connected to the first output electrode to produce signals at the sub-carrier frequency from the pilot signals, means connected between the full-wave rectifier and the first control electrode for introducing the signals from the full-wave rectifier to the first control electrode to obtain a modulation of these signals and the modulated second resultant signals in the current control member for the production of remodulated signals with upper and lower sidebands and with a center frequency corresponding to the sub-carrier frequency, and means connected to the second output electrode for receiving the remodulated signals produced in the current control member.

16. The combination set forth in claim 15 wherein a tuned circuit is included in the second single stage and is resonant at the sub-carrier frequency and is provided with characteristics to de-emphasize the remodulated signals in the upper and lower sidebands with progressive changes in frequency from the sub-carrier frequency.

17. In combination for use in a system wherein first and second stereo signals representing stereo sound are added to obtain first resultant signals and wherein the first and second stereo signals are subtracted to obtain resultant signals and wherein the second resultant signals are modulated on a suppressed sub-carrier and wherein the first resultant signals and the modulated second resultant signals and pilot signals having a harmonic relationship to the sub-carrier are transmitted in modulated form to a receiver removed from the transmitter and wherein stages are included at the receiver for demodulating the received signals to recover the first resultant signals and the modulated second resultant signals and the pilot signals, a single stage responsive to the pilot signals for producing signals at the sub-carrier frequency and responsive to the modulated second resultant signals and the signals at the sub-carrier frequency for producing remodulated signals having upper and lower sidebands with a center frequency corresponding to the sub-carrier frequency, the single stage including:

a current control member having a control element and at least one output element, means connected to the control element for introducing the pilot signals and the modulated second resultant signals to the control element, means connected to the output element for doubling the frequency of the pilot signals to produce the signals at the sub-carrier frequency, means connected to the frequency-doubling means for introducing the signals at the sub-carrier frequency from the frequency-doubling means to the control element of the current control member to obtain a mixing of the signals at the sub-carrier frequency and the modulated second resultant signals for the production of the remodulated signals having the upper and lower sidebands, and means connected to the output element of the current control member for receiving the remodulated signals having the upper and lower sidebands.

18. The combination set forth in claim 17 wherein a first circuit tuned to the sub-carrier frequency is connected to the output element of the current control member to provide a progressive de-emphasis of the remodulated signals from the current control member with progressive changes in the frequency of the signals in the upper and lower sidebands from the sub-carrier frequency.

19. The combination set forth in claim 18 wherein the frequency-doubling means includes a full-wave rectifier and a second tuned circuit resonant at the sub-carrier frequency and wherein a coupling capacitor is connected between the frequency-doubling means and the control element of the current-control member to introduce the signals at the sub-carrier frequency to the current control member.

No references cited.

DAVID G. REDINBAUGH, *Primary Examiner.*